United States Patent [19]

Platka, III et al.

[11] 4,244,993
[45] Jan. 13, 1981

[54] METHOD FOR MAKING SIMULATED MARBLE AND PRODUCT OF THE METHOD

[75] Inventors: William J. Platka, III, Beverly Hills; Richard A. Ganger, Carmel Valley, both of Calif.

[73] Assignee: P & G Products, Inc., Van Nuys, Calif.

[21] Appl. No.: 56,342

[22] Filed: Jul. 10, 1979

[51] Int. Cl.³ .................. B29C 13/00; B29C 21/00; B29D 9/00; B29G 7/00
[52] U.S. Cl. ............................. 428/15; 264/73; 264/138; 264/245; 264/255; 264/309; 428/35; 428/161
[58] Field of Search ............... 264/73, 245, 255, 309, 264/337, 134, 135, 74, 246, 250, 138, 139, 309; 4/173 R, 166, 167, 173, 187 R; 428/15, 161, 35

[56] References Cited

U.S. PATENT DOCUMENTS

| 2,176,837 | 10/1939 | Ellis . | |
|---|---|---|---|
| 2,311,613 | 2/1943 | Slayter . | |
| 2,746,896 | 5/1956 | Thompson . | |
| 2,752,275 | 9/1957 | Raskin et al. . | |
| 2,817,619 | 12/1957 | Bickel et al. . | |
| 2,944,994 | 7/1960 | Singleton et al. . | |
| 2,951,001 | 8/1960 | Rubenstein . | |
| 3,219,735 | 11/1965 | Iverson et al. | 264/73 |
| 3,341,396 | 9/1967 | Iverson . | |
| 3,582,388 | 6/1971 | Stayner | 428/431 |
| 3,773,886 | 11/1973 | Starr et al. | 264/255 |
| 3,812,074 | 5/1974 | Oswitch et al. | 264/255 |
| 3,888,646 | 6/1975 | Kuriyama et al. | 264/1 |
| 3,917,766 | 11/1975 | Howden | 264/1 |
| 4,043,853 | 8/1977 | Saladino | 4/173 R |
| 4,158,585 | 6/1979 | Wright | 4/173 R |

FOREIGN PATENT DOCUMENTS 529507 2/1954 Belgium .

OTHER PUBLICATIONS

Anon., Modern Plastics Encyclopedia, pp. 26 & 27 relied on McGraw Hill (1966), N. Y.
Weast et al., Handbook of Chem. & Physics, Chem Rubber Co., 50th Ed., Cleveland (1969), p. E-232.

Primary Examiner—W. E. Hoag
Attorney, Agent, or Firm—Richard H. Zaitlen

[57] ABSTRACT

An improved method for the manufacture of simulated marble and onyx products is disclosed. The process comprises the steps of applying a substantially clear coating to a mold, applying a first layer of a mixture of polyester resin and filler over the coating, forming readily visible striations in the first layer of resin and filler, applying a layer of glass fibers thereover, applying a second layer of polyester resin and filler over the layer of glass fibers and permitting the various layers to completely cure so as to form the final product.

26 Claims, 8 Drawing Figures

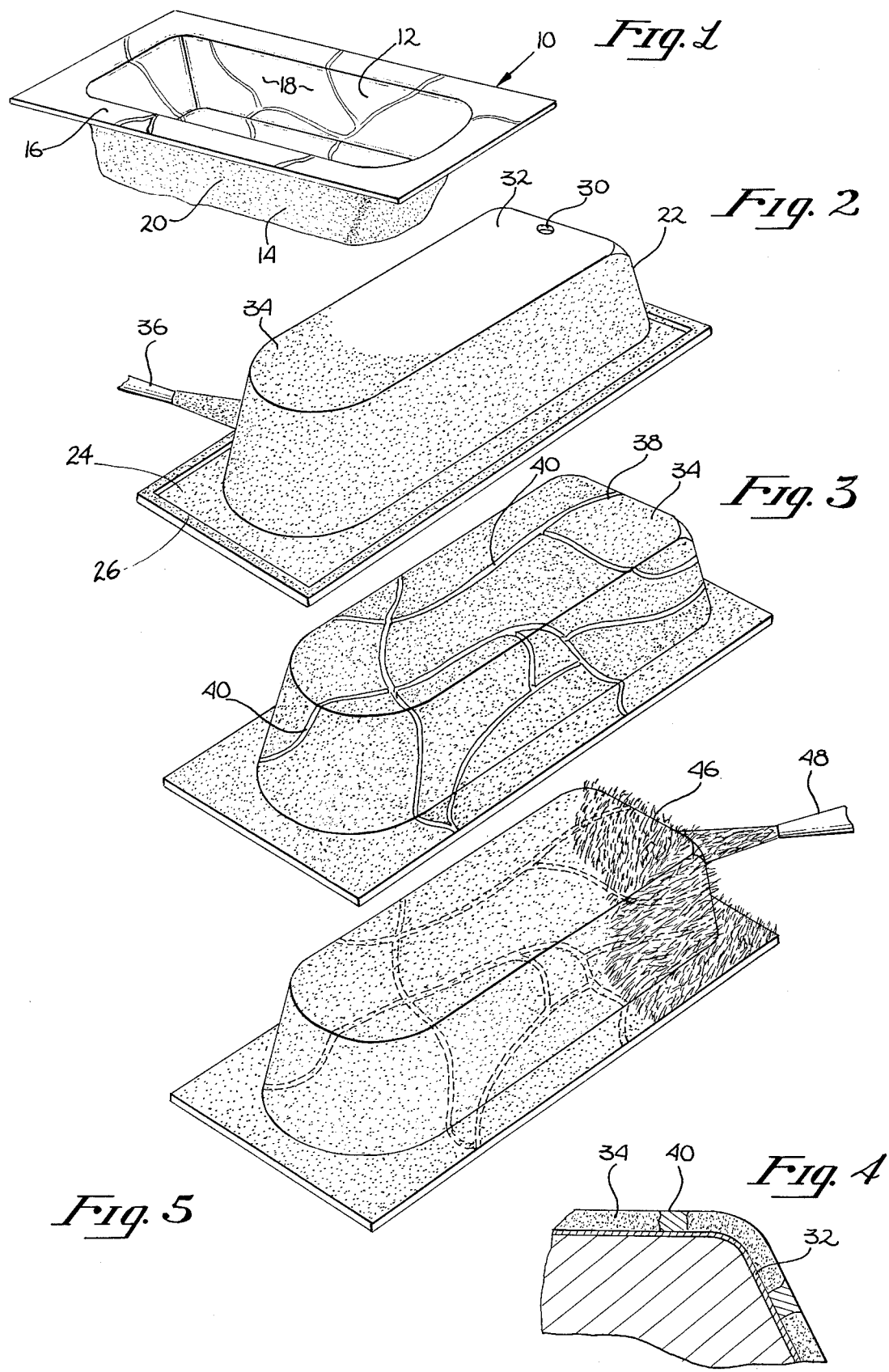

METHOD FOR MAKING SIMULATED MARBLE AND PRODUCT OF THE METHOD

BACKGROUND OF THE INVENTION

1. Field of the Invention

This invention relates to an improved process for making a stable, reinforced simulated marble or onyx product as well as the product per se.

2. Prior Art

In order to make a simulated marble or onyx product, various methods have been devised for creating the veining or striations in a resin matrix so as to achieve an appearance similar to that of real marble or onyx. Perhaps one of the oldest methods of creating a "marble look" is similar to that of baking a marble cake. In both situations, a colorant is added to a binder material (flour in one instance and resin in the other). By only stirring the colorant a limited extent, striations of color are generated throughout the binder. When the product is finished, an appearance similar to that of marble is achieved.

Synthetic or simulated marble and onyx products are well recognized in the prior art. These products are usually cast so as to form washbasins, countertops and the like. There have been attempts to use the prior art processes for making larger structures, such as, for example, bathtubs, hot tubs, etc., but they have not proved to be successful. One problem with large structures made by the prior art processes is that they are extremely heavy and thus extremely difficult to transport. Further, the large quantity of resin required to make such a structure substantially increased the price. Another disadvantage associated with large structures made under the prior art processes was that they were temperature sensitive. This can lead to shattering, warpage or other problems under certain conditions.

One prior art teaching for making simulated onyx is shown in U.S. Pat. No. 3,396,067. In that patent, opaque filler is embedded in a cast, transparent thermoset polyester copolymer resin. The polyester resin is filled with well-known fillers, glass firt, silica, etc., which have the same index of refraction as the resin. U.S. Pat. No. 3,328,499 shows a similar casting method for making similar products. In another prior art teaching, U.S. Pat. No. 3,773,886, a process is disclosed wherein various layers are utilized so as to achieve a simulated or cultured marble appearance. In order to achieve the striations in the '886 patent, a mixture which includes a rubbery polymeric material producing elongated striations is utilized.

Other prior art processes for making simulated marble and the like are disclosed in U.S. Pat. Nos. 3,370,114; 3,394,021; and 3,434,911.

These references all relate to processes which have a number of shortcomings. Thus, there has been a long felt need for a process which is relatively straight forward and which could be used to make even large structures having a simulated marble or onyx appearance.

The present invention enables even large structures, such as bathtubs, to be manufactured, but does so in such a manner that problems of shattering, warpage and the like are overcome. In addition, the product of the present invention does not use as much resin as associated with the prior art products. These and other advantages are achieved by Applicant's process which produces a completely different cross-section so as to achieve a high strength-to-weight ratio. These advantages are achieved without sacrificing the veining or striations in the product. In addition, the process of the present invention utilizes compositions which can be spray applied obviating the prior art process of casting.

SUMMARY OF THE INVENTION

The present invention is applicable to the fabrication of a wide range of products. However, it has special applicability in producing a large structure which has a simulated marble or onyx appearance. This type of appearance has been found to be aesthetically pleasing in connection with washbasins, countertops, bathtubs, and the like.

In the process of the present invention, a mold having a predetermined configuration is initially coated with a substantially clear, hardenable resin coating. This type of initial coating is well known in the art and is often times referred to as a "gelcoat". After the gelcoat is applied, a first layer of a polyester resin and filler mixture is sprayed over the gelcoat. The ability of this composition to be sprayed represents one of the advantages of the present invention over the prior art. In the past, various casting steps were employed. Casting is more time-consuming than spraying. Further spraying permits a more controlled application of the composition. Veins of opaque filler are then formed in the first layer of the polyester resin/filler mixture. After the veined polyester resin/filler layer has partially cured so as to form a tacky coating, a layer of glass fibers is disposed over the layer and laminated thereon. These glass fibers have also previously been coated with a hardenable resin and associated catalyst, and the fiber-resin filler composition is permitted to cure at least to a tacky state. The formation of a discrete fiber layer in a simulated marble or onyx product as set forth herein represents yet another advantage over the prior art. By the formation of a fiber layer, high strength-to-weight ratios have been achieved. This enables the resin layers to be made thinner without sacrificing strength. A second layer of polyester resin/filler mixture is applied over the glass fibers and also permitted to cure.

After final and total curing of the various layers takes place, the product may be removed from the mold. A sandwich construction of polyester resin/filler-glass fiber-polyester resin/filler is formed. This sandwich construction, and the use of the specific components of each of the layers of the sandwich has been found to be of special benefit for large structures such as bathtubs. In addition, by the use of the specific compositions a translucent product having the appearance of simulated marble or onyx can be created at a fraction of the cost of real marble or onyx.

The novel features which are believed to be characteristic of this invention, both as to its organization and method of operation, together with further objectives and advantages thereof will be better understood from the following description considered in connection with the accompanying drawing in which a presently preferred embodiment of the invention is illustrated by way of example. It is to be expressly understood, however, that the drawings are for the purpose of illustration and description only, and are not intended as definition of the limits of the invention.

BRIEF DESCRIPTION OF THE DRAWINGS

FIG. 1 is a perspective view showing a final product created by the process of the present invention.

FIG. 2 is a perspective view showing a mold coated with a first layer of polyester resin and filler.

FIG. 3 is a perspective view of the mold wherein veins of color have been formed in the first layer of polyester resin/filler.

FIG. 4 is a cross-sectional view showing the initial coating on the mold, as well as the veins formed in the first layer of polyester resin/filler.

FIG. 5 shows the application of a glass fiber layer over the polyester resin/filler layer.

DESCRIPTION OF THE PREFERRED EMBODIMENT

Figure 6:
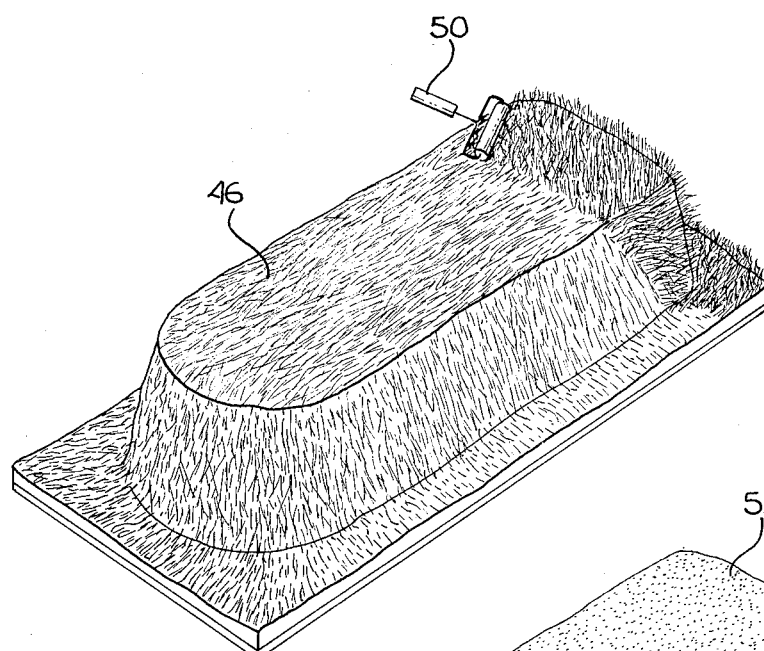
FIG. 6 shows the laminating of such glass fibers over the mold.

Broadly, the present invention is directed to a process for the manufacture of a simulated marble or onyx product and the product per se. In simulating marble or onyx, it is generally thought necessary to achieve a look such that the product appears to have a depth associated to it. This has been achieved in the prior art by casting an initial gelcoat layer and then a filled translucent polyester resin layer. The present invention also may utilize an initial gelcoat and a filled, translucent polyester resin, but obviates the need for casting these layers. In addition, substantially different components are utilized for each layer leading to a different cross-section.

Referring to FIG. 1, a final product 10 produced by Applicants' method is shown as having a tub-like configuration. The product 10 has a generally central cavity 12 formed by sides 14. Sides 14, in the present embodiment, continue outwardly so as to form rim 16. By the use of a process of the present invention, inner surface 18 has a substantially smooth and pleasant feel to it such as that associated with a ceramic bathtub, washbasin or the like. Because the outer surface 20 is generally not readily visible, there is no need to make it smooth and thus it generally has a rough appearance.

Referring now to FIG. 2, one can see a mold 22 used to make the finished product 10 discussed with reference to FIG. 1. Mold 22 has an outwardly extending rim 24 terminating in an upwardly extending ledge 26. The mold 22 has a generally trapezoidal-shaped male shape which is used to form the cavity 12 in the finished product 10. An opening 30 is disposed on the mold 22 and is placed so as to form the drain in a typical bathtub. It should be understood that the finished product 10, as well as the mold 22, are used for the purposes of illustration and a wide variety of other shapes and sizes are within the scope of the present invention.

As stated above, in order to provide the product 10 with a substantially smooth inner surface 18, the mold 22 is initially coated with a clear resin film 32 referred to herein as a gelcoat. However, before application of the gelcoat, it may be desirable to coat the mold with a conventional mold-release agent such as, for example, carnauba wax, silicons or other similar non-release materials. It should be understood that the use of resin gelcoats is well recognized in the art and will not be discussed in any great detail herein. Typically, the gelcoat is a clear, hardenable polyester resin which is applied to the mold by means of a spray gun, brush or the like. In accordance with the process of the present invention, the clear polyester gelcoat film 32 preferably has a thickness of about 10 to about 20 mils. It is believed that if the thickness of the gelcoat film is much greater than about 25 mils, the film has a tendency to discolor and turn yellow. On the other hand, if less than about 10 mils of the film is used, the film will have a tendency to be attacked and adversely affected by the color veining hereinbelow discussed in greater detail. Examples of well recognized polyester resin gelcoats are those which contain a polymerizable unsaturate polyester, for example, prepared from ethylenically unsaturated polycarboycyclic acids and polyhydric alcohols. Such materials are typically prepared by heating the polyhydric alcohols and polybasic acids under esterification conditions until the acid value of the reaction mixture is about 5 to 100 or more, preferably about 10 to 50. The reaction mixture is usually heated until the mixture reaches the reaction temperature at which time water vapor is evolved. The temperature is then slowly increased until the desired reaction temperature is reached, after which the reaction temperature is maintained until the desired acid number is reached. For example, typical reaction times may range from 5 to 50 hours with reaction temperatures typically ranging from 180 to 150 degrees C. In addition to the unsaturated polyester resin, there may also be present a vinyl monomer and the term polyester resin gelcoat as used herein, is meant to include the presence of such vinyl monomers. These vinyl monomers include, for example, alpha-methylstyrene, paramethylstyrene, divinylbenzene, methylmethacrylate, diallyl phthalate, and the like. Also used with the polyester resin gelcoat is a polymerization catalyst or mixture of catalysts. Such catalysts are well recognized in the art and usually are based on a peroxide type compound such as, for example, methyl ethyl ketone peroxide, benzoyl peroxide, tertiary butyl hydroperoxide, and the like. Typically, the catalyst may be present in amounts ranging from about 0.1 to about 5 percent by weight of the polyester resin gelcoat.

The polyester resin gelcoat may also contain other promoters, antioxidants, and the like. As stated above, the purpose of the gelcoat is to provide a clear, stain resistant film on the surface of the mold. Many types of such gelcoats are available under such brand names as Ferro 50-415 manufactured by Ferro Corporation; and Ram 66-36X manufactured by Ram Chemicals. Other resins which produce a clear, hard temperature-stable film are also within the scope of this invention.

After the gelcoat is applied, it begins to react and gel or crosslink such that an initially tacky film is formed on the mold 22. This curing or gelling step is preferably carried out at ambient conditions for approximately 20 minutes. Curing time can be decreased by the application of heat and/or the use of other promoters or catalysts.

Once the gelcoat 32 has reached a tacky consistency indicating at least partial crosslinking, another resin coating is applied. This second coating is shown as layer 34. Layer 34 is sprayed on by means of a spray gun 36. Broadly, the composition of layer 34 is a thermosetting polyester matrix resin and filler. Of course other additives such as flame retardants, colorants, and the like are also within the scope of the present invention. In the past, when making synthetic marble or onyx products, casting was the method-of-choice, and thus, the ability of the resin/filler composition of the present invention to be sprayed represents a distinct improvement over the prior art. As used herein with reference to layer 34, the term "polyester matrix resin" is meant to include the homopolymers and copolymers of polyesters.

A wide variety of generally clear, transparent or translucent thermosetting polyester resins are available and are within the scope of the present invention. In the preferred embodiment, such resins are formed by the copolymerization of styrene and an unsaturated polyester or alkaline resin formed by reacting an alpha, beta-unsaturated dicarboxylic acid with glycol. Resins of this type are disclosed in U.S. Pat. Nos. 3,396,067 and 2,255,313. Other unsaturated polyester resins within the scope of the present invention are those discussed in Modern Plastics as being the polycondensation product of a dicarboxylic acid with a dihydric alcohol. Examples of diacid include phthalic acid and isophthalic acid. Examples of the dihydric alcohol include ethylene glycol and propylene glycol. These types of unsaturated polyester resins are usually catalyzed with a peroxide such as those mentioned above with regards to gelcoat 32.

The following are examples of commercially available polyester matrix resins which meet the requirements of polyester matrix resin to be used in connection with layer 34. Similar S-793C, which is a moderate viscosity polyester resin (1100 cps avg.) having a refractive index at 25 degrees C. of 1.5415, and Reichhold Polylite 32-133 which is a styrene-modified polyester of the low-reactivity type, and which has a viscosity of 1400–1600 cps.

It is usually advantageous to add additional liquid polymerizable monomer, such as styrene, to the unsaturated polyester, so as to make the unsaturated polyester resin more fluid and also to cross-link the resin at the time of curing. When a commercial polyester resin which contains such a vinyl monomer is used, it is often times desirable to add additional monomer for fluidity and cross-linking advantages. Up to 60% by weight of such polymerizable monomer is within the scope of the present invention. Other liquid monomers mentioned with respect to layer 32 can also be used in forming layer 34. The cured polyester matrix resin should be such that its index of refraction ranges from about 1.5 to 1.7.

In terms of the fillers which are used, the filler is preferably finely divided, in a size of 60 mesh or finer, and can be any one of the well recognized fillers used in the prior art including silica, glass frit, aluminum trihydrate, glass flour, quartz flour, onyx flour and the like. The general criteria for the filler is one which, when homogeneously mixed into the matrix resin, produces a product which is translucent. In this manner, a depth is given to the product which helps create the appearance of marble or onyx. Fillers having a refractive index the same as that of the polyester resin function in this manner. Preferably, the polyester matrix resin is present in an amount of 15 to 50% by weight, and from 50 to 85% by weight of the filler is used. In addition to the polyester matrix resin and filler, from 2 to 20 wt.% based on the total weight of the resin/filler, preferably 5–16 wt.% of a solvent for the resin is added to the resin/filler mixture. The solvent is selected such that it quickly evaporates. Those solvents particularly adopted for use in the present invention include, acetone, methyl ethyl ketone, xylene, methanol, ethanol, and the like. By the use of a highly volatile solvent, the resin/filler mixture can be more readily sprayed onto mold 22.

In the present invention, spraying is achieved by spray gun 36. Spray gun 36 has three (3) inlets, one for supplying the matrix resin, filler, solvent composition; one for the catalyst and one for the colorant, if a colorant is desired. Mold 22 is sprayed with the resin/filler mixture until the entire mold is coated. To prevent the resin/filler mixture from escaping, ledge 26 forms a boundary around the mold 22.

After the mold 22 has been completely covered with layer 34 of the polyester matrix resin/filler mixture, the appearance of veins or striations is introduced by forming various cuts 38 with a blunt instrument such as a wooden blade or the like in layer 34. Other methods for forming cuts 38 are also within the scope of this invention. These cuts 38 do not proceed through the gelcoat 32 and are made only in the layer 34. After a sufficient number of cuts 38 are made, each of the cuts is filled in with a readily visible, highly pigmented or otherwise colored composition. This composition may contain a thermosetting polyester resin and catalyst of the type hereinabove described with referencce to layer 34. The high percentage (50–80 wt.%) of colorant, which can be opaque and may comprise finely divided calcium carbonate, titanium dioxide, glass frit, dyes or the like, forms veins or striations 40 in layer 34. This perhaps is best illustrated in FIGS. 3 and 4. After each of the cuts 38 are filled in with the highly pigmented composition, additional polyester matrix resin/filler mixture as that used to make layer 34 may be applied over the veins 40 so as to insure that they are completely covered and imbedded in layer 34. Other methods for forming veins 40 can also be used; for example, the use of spraying the veins on layer 34, using a splatter gun, or the like. Layer 34 is now permitted to partially cure. This is usually achieved by placing mold 22 in an oven at 100–150 degrees F. for approximately 20 minutes.

As shown in FIG. 5, after the layer 34 has reached a state of tackiness, a layer 46 of fibers is sprayed onto the mold 22 by means of a fiber spray gun 48. Such guns are well known in the art and will not be described in great detail herein. Preferably, glass fibers are used which are coated with a silane compound and are of a length of from ½ inch to 2 inches. Other fillers such as flax fibers, carbon fibers, plastic fibers could also be used. The glass fibers may also be sprayed on in conjunction with a thermosetting polyester resin and catalyst as described with reference to layer 34. In this manner, a stronger and more viable layer 46 is formed.

Referring now to FIG. 6 one can see that the glass fibers have been formed into layer 46 by means of rolling the glass fibers. This is accomplished by means of roller 50 or the equivalent. Rolling the glass fibers removes trapped air and forms a generally uniform layer such that discrete fibers are not readily visible through layer 34.

Figure 7:
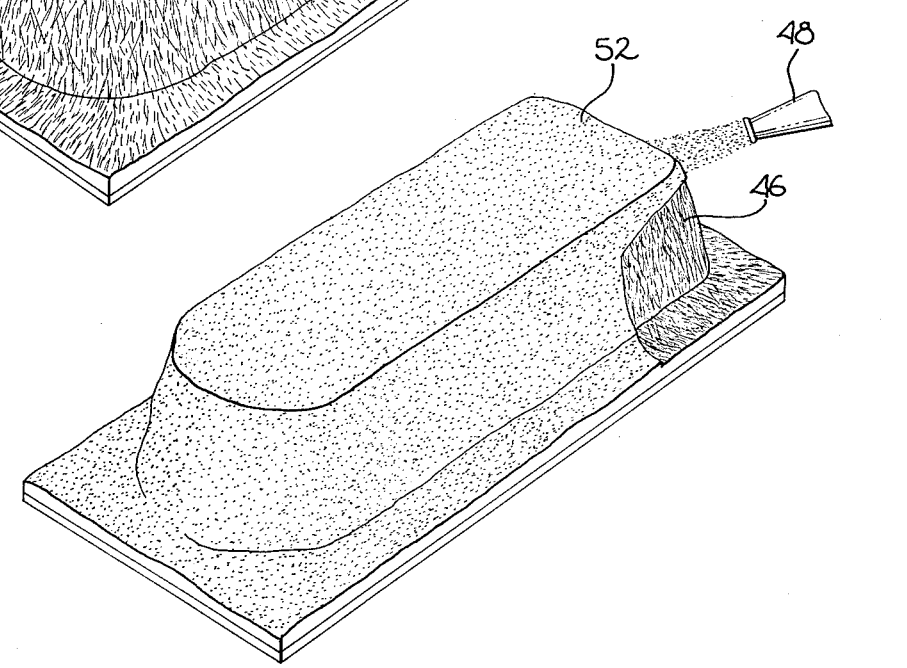
FIG. 7 shows the application of a second layer of polyester resin/filler.
Figure 8:
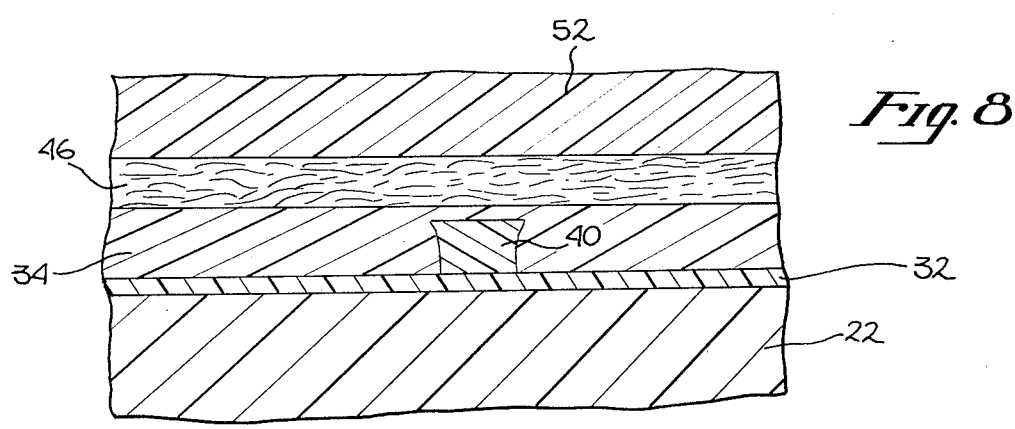
FIG. 8 is a cross-sectional view of the various layers on the mold.

The fiber layer 46 is permitted to cure at least to the point of being tacky by placing mold 22 in the heated oven for approximately 20 minutes. Then, as shown in FIG. 7, another layer 52 of polyester matrix resin/filler is applied over the fiber layer 46. Layer 52 is made of substantially the same polymer, monomer, filler and catalyst as that used with respect to layer 34. However, if desired, layer 52 can be made of a different proportion of resin and filler and different fillers and resins could also be used. It should be understood that the cross-section of the final product as shown in FIG. 8, is such that the thickness of layers 34 and 52 is approximately equal. Preferably such layer 34 and 52 are each ⅛ inch thick. The glass fiber layer, layer 46, is approximately ⅛ inch thick. This balanced sandwich-type construction have been found to be particularly beneficial in that it prevents warpage and enables the product so produced to be used in connection with both hot and cold water without formations of cracks or the like.

After the final layer 52 is applied, the mold 22 is again placed in an oven at 100-150 degrees F. for sufficient time such that complete curing of all layers takes place. This usually takes about 1 hour, depending upon a number of factors, such as the catalyst used, thickness, etc. After final curing, the product 10, as shown in FIG. 1, can be readily removed from mold 22 and the process repeated. One can see the irregular striations 40 through the gelcoat layer 32 which appear to extend through the entire thickness of the product 10. This look is achieved by the use of the translucent mixture formed from the polyester matrix resin and filler composition. Usually, the glass fiber layer 46 is not visible through the first layer 34. This, of course, depends upon various factors such as specific filler and/or resin used as well as the amount of filler present.

While the present invention has been described in its preferred embodiments, it is to be understood that the words which have been used are words of description rather than of limitation. For example, in some embodiments, there is no need for the second resin/filler layer 52, and gelcoat layer 32 may also be omitted in certain cases. Thus, changes within the purview of the appended claims may be made without departing from the true scope and spirit of the invention in its broader aspects.

We claim:

1. A process for making a reinforced simulated marble or onyx product comprising the step of:
   (a) providing a mold;
   (b) applying a thin and substantially clear, hardenable resin coating on said mold;
   (c) applying a first layer of a mixture of thermosetting polyester resin and filler over said hardenable resin coating, said polyester resin and filler selected such that said first layer is essentially translucent;
   (d) permitting said first layer to partially cure;
   (e) forming at least one groove in said partially cured first layer;
   (f) depositing visible veins of a mixture of finely divided filler and binder in said groove;
   (g) applying a layer of fibers over said first polyester resin/filler layer and said veins;
   (h) applying a second layer of polyester resin and filler over said fibers; and
   (i) permitting said various layers to cure thereby forming said product.

2. A process according to claim 1 wherein said mold is a single cavity mold in the shape of a bathtub.

3. A process according to claim 1 wherein said veins are made from a composition comprising from 50-80 wt.% of an inorganic filler and a resinous binder.

4. A process according to claim 1 wherein the mixture in step (c) includes a solvent and is applied by means of spraying said polyester resin/filler/solvent mixture.

5. A product produced by the process of claim 1 or 2.

6. A process according to claim 1 wherein each layer formed in steps (b) and (c) is permitted to cure at least to a tacky state prior to the application of a subsequent layer.

7. A process according to claim 1 wherein in step (e), each said groove is formed by cutting into said first layer.

8. A process according to claim 1 wherein said layers formed in steps (c) and (h) have approximately the same thickness.

9. A process according to claim 1 wherein, in step (f), each said groove is formed by cutting into said first layer.

10. A process according to claim 1 wherein said layers formed in steps (d), (i) and (j) have approximately the same thickness.

11. A process according to claim 1 wherein said filler used in said polyester resin/filler mixture is selected from the group consisting of glass frit, aluminum trihydrate and mixtures thereof.

12. A product produced by the process of claim 11.

13. A process for making a reinforced simulated marble or onyx product comprising the steps of:
   (a) providing a mold;
   (b) spraying a composition comprising (i) an unsaturated polyester resin; (ii) a compatible liquid polymerizerable monomer which crosslinks said polyester resin; (iii) a filler; and (iv) from 2-20 wt.% of a solvent for said unsaturated polyester resin and said monomer on said mold so as to form a first layer, and wherein said crosslinked polyester resin and said filler are selected such that said first layer is essentially translucent;
   (c) permitting said first layer to partially cure;
   (d) forming at least one groove in said partially cured first layer;
   (e) depositing visible veins of a composition comprising a finely divided inorganic filler and binder in said groove;
   (f) applying a layer of a mixture of glass fibers and hardenable resin over said first layer and said veins so as to form a backing; and
   (g) permitting said various layers to completely cure whereby a reinforced simulated marble or onyx product is produced.

14. A process according to claim 13 wherein said fibers in step (f) are glass fibers.

15. A process according to claim 13 wherein prior to step (b), the mold is coated with a clear, thin coating.

16. The product produced by the process of claims 13 or 14.

17. A process for making a reinforced simulated marble or onyx product comprising the steps of:
   (a) providing a mold;
   (b) applying a thin and substantially clear, hardenable resin coating on said mold;
   (c) permitting said clear, hardenable resin coating to at least partially cure;
   (d) spraying a first layer of a polyester resin/filler composition over said mold, said composition comprising:
      (i) a thermosetting polyester matrix resin formed from an ethylenically unsaturated polyester resin and a compatible liquid polymerizable monomer for crosslinking said unsaturated polyester resin;
      (ii) a finely divided filler, said filler and said matrix resin having substantially the same index of refraction such that said first layer is essentially translucent; and
      (iii) a low boiling point solvent;
   (e) permitting said first layer to partially cure;
   (f) forming a plurality of grooves in said partially cured first layer;

(g) depositing readily visible veins of a composition comprising a finely divided filler and binder in said grooves;
(h) permitting said first layer to further cure;
(i) applying a layer of a mixture of fibers and hardenable binder over said first layer and said veins;
(j) applying a second layer of thermosetting polyester resin and filler mixture over said fiber layer; and
(k) permitting said various layers to cure thereby forming said product.

18. A process according to claim 17 wherein said clear, hardenable resin coating applied in step (b) is a thermoseting polyester resin.

19. The product produced by the process of claim 17 or 18.

20. A process according to claim 17 wherein the fibers in step (i) are glass fibers and said hardenable binder is a polyester resin.

21. A process according to claim 17 wherein the composition applied in steps (d) and (j) each comprise from about 50 to 85% wt.% of a filler selected from the group consisting of glass frit, silica, aluminum trihydrate and mixtures thereof.

22. A process according to claim 21 wherein said finely divided filler will pass through a 60 mesh sieve.

23. The product produced by the process of claim 21 or 22.

24. A process according to claim 17 wherein said veins formed in step (g) are formed from a highly pigmented polyester resin composition.

25. A process according to claim 21 wherein said solvent is present in an amount of from about 5 to 16 wt.% based on the total weight of (i) and (ii).

26. The product produced by the process of claim 25 or 24.

* * * * *